United States Patent
Ballard (10) Patent No.: US 10,437,478 B1
(45) Date of Patent: Oct. 8, 2019

(54) REPLICATION BASED ON A DIFFERENTIAL MULTIPLE WRITE COMMAND

(71) Applicant: HEWLETT PACKARD ENTERPRISE DEVELOPMENT LP, Houston, TX (US)

(72) Inventor: Curtis C. Ballard, Eaton, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/964,768

(22) Filed: Apr. 27, 2018

(51) Int. Cl.
G06F 3/06 (2006.01)

(52) U.S. Cl.
CPC ............ G06F 3/061 (2013.01); G06F 3/0644 (2013.01); G06F 3/0659 (2013.01); G06F 3/0689 (2013.01)

(58) Field of Classification Search
None
See application file for complete search history.

(56) References Cited

U.S. PATENT DOCUMENTS

| | | | |
|---|---|---|---|
| 6,594,745 | B2 | 7/2003 | Grover |
| 9,274,718 | B1 | 3/2016 | Natanzon et al. |
| 2017/0083408 | A1 | 3/2017 | Vijayan |

OTHER PUBLICATIONS

DataFlair Web Services Pvt Ltd, "HDFS Tutorial | Hadoop File Write Operation | How to Write data in HDFS," (Video), Jun. 18, 2016, <https://www.youtube.com/watch?v=hwCh4OMjLK0>.

Aaron et al., "How data or file is written into HDFS?," Jun.-Jul. 2017, DataFlair Discussion Forum » Hadoop, <https://data-flair.training/forums/topic/how-data-or-file-is-written-into-hdfs>.
Anderson et al. "Write Same command" Nov. 16, 1987, To: X3T9.2 SCSI-2 Committee.
Apache Software Foundation, "Class FSDataColputStream," 2017, Apache Hadoop Main 2.7.4 API, <https://hadoop.apache.org/docs/r2.7.4/apl/org/apache/hadoop/fs/FSDataOutputStream.html>.
Curtis Ballard, "15-087r9 SBC-4 Scattered writes," Mar. 15, 2016.
dataflair.com, "Hadoop HDFS Data Read and Write Operations," (Web Page), Jun. 13, 2016. (Jul. 30, 2017 version). 10 pages, >http://data-flair.training/blogs/hadoop-hdfs-data-read-and-write-operations/>.
Dennis Appleyard, "T10/16-031r7-SPC-5: Extended Copy Enhancements for Tape," Jul. 13, 2016.
FH K et al., "Describe Write operation in HDFS?," Sep.-Oct. 2017, DataFlair Discussion Forum » Hadoop, <http://data-flair.training/forums/topic/describe-write-operation-in-hdfs>.
Ghemawat et al., "The Google File System," Oct. 19-22, 2003, SOSP'03, <http://www.cs.cornell.edu/courses/cs614/2004sp/papers/gfs.pdf>.

(Continued)

Primary Examiner — Kevin Verbrugge
(74) Attorney, Agent, or Firm — Hewlett Packard Enterprise Patent Department (57) ABSTRACT

Examples include replication based on a differential multiple write command. Examples include receipt, via a storage protocol path, of a differential multiple write command that specifies to store provided data to a first address range at the first storage array and to a different second address range of a second storage array, generation of storage-processed data representing the provided data in a different form than the provided data, and replication, via a replication path, the storage-processed data from the first storage array to the second storage array.

20 Claims, 4 Drawing Sheets

(56) References Cited

OTHER PUBLICATIONS

Goel, S. et al., "Data Replication Strategies in Wide Area Distributed Systems," (Research Paper), Apr. 23, 2006, 27 pages, http://www.cloudbus.org/papers/DataReplicationInDSChapter2006.pdf.

Posey, Brien, "Data Replication Technologies: Benefits and Drawbacks," (Research Paper), 2017, 7 pages http://searchdisasterrecovery.techtarget.com/tip/Data-replication-technologies-Benefits-and-drawbacks.

Nardelli, M., "(Big) Data Storage Systems," (Research Paper), 2016, 18 pages, http://www.ce.uniroma2.it/courses/sabd1617/slides/Storage.pdf.

Oracle, "Class OutputStream," 2017, Java Platform SE 7, <https://docs.oracle.com/javase/7/docs/api/java/io/OutputStream.html?is-external=true>.

Ralph O. Weber, "XCOPYv2: Basic Extended Copy Upgrades," Aug. 30, 2011, To: T10 Technical Committee.

Wikipedia, "Replication (computing)," Dec. 4, 2017, <https://en.wikipedia.org/w/index.php?title=Replication_(computing)&oldid=813641200>.

REPLICATION BASED ON A DIFFERENTIAL MULTIPLE WRITE COMMAND

BACKGROUND

In a computing environment, a host (or client) computing device may write data to a storage array for persistent storage. The storage array may be implemented by a computing device separate from the host or client computing device. In some examples, multiple storage arrays may each store data from a host computing device. For example, in an implementation of a distributed file system, each write from a host computing device may be stored to multiple different storage arrays.

BRIEF DESCRIPTION OF THE DRAWINGS

The following detailed description references the drawings, wherein.

DETAILED DESCRIPTION

As noted above, multiple storage arrays may each store data from a host computing device (which may be referred to as a "host" or "client" herein). For example, in a computing environment implementing a distributed file system, each write from a host computing device to the distributed file system may be stored to multiple different storage arrays. In some examples, data of a single write from a host computing device may be stored to different locations in each of the different storage arrays.

As an example, a computing environment may store data for a distributed file system across six different storage arrays, and each write may be stored at three of the six storage arrays. In order to perform each write quickly, the computing environment may select three of the six arrays to store data for a given write operation based on storage array activity level (or the like) to attempt to perform the write operations on storage arrays that may be able to accomplish the write with less latency. For example, where the six storage arrays are represented by letters A-F, a first write may be assigned to storage arrays A, B, and C. The next write may then be assigned to storage arrays D, E, and F, since they are less busy than A, B, and C (one or more of which may still need to complete the first write when the second arrives). If each of these writes are done sequentially at the selected three arrays (e.g., A, then B, then C for the first write, and D, then E, then F for the second write), then the first arrays to become available again for a third write may be A and D (the first storage arrays to be written for the first and second writes). As such, a third write may be written to arrays A, D, and B, for example.

In such examples, because data of different write operations may be provided to different sets of arrays, the data stored at each storage array may differ in part (e.g., any given two storage arrays may share some data, but are unlikely to share all the same data). As such, it would be inefficient to attempt to keep the data for each write at the same location (e.g., address range) at each storage array. So, data of write operations may be stored at different locations (e.g., address ranges) at different storage arrays.

For each write operation to a set of storage arrays, if the host computing device were to provide the write operation to each of the selected set of storage arrays, then that would consume a large amount of the host's input/output (I/O) bandwidth (e.g., the host would have to do three writes for each desired write operation). As an alternative, if the host were to provide the write operation to just a first storage array in the set, the storage arrays in the set may then distribute the write operation among themselves. While this may be more advantageous to the host (which is able to offload all but one of the write operations), this may be disadvantageous to the storage arrays, which may then utilize their storage protocol paths to distribute the writes. For example, passing a write operation from a first storage array to a second storage array may utilize and occupy a storage protocol path output of the first storage array and a storage protocol path input at the second storage array, thus creating additional traffic occupying storage protocol bandwidth for the arrays. In some examples, the storage protocol paths between the arrays may be shared with host(s), so the additional traffic may impede I/O between the host(s) and the arrays. In other examples, even when the storage protocol paths between the arrays are not shared with the host(s), a storage array may still use the same resources to service storage protocol path(s) to the host and storage protocol path(s) to other arrays, so the additional traffic between arrays may impede the storage array's servicing of I/O from the host(s). In addition, replication techniques that replicate volumes from one array to another may not address this issue, as such techniques may replicate data to equivalent address ranges at other array(s), while in the example described above, the data may be intended for different (e.g., non-equivalent) address ranges in different storage array(s). Additionally, by distributing the data in this manner, each storage array may separately use its own processing resource(s) to create the storage-processed form of the write data that is suitable for storage in physical storage devices of the storage array. Such storage processing may include one or more of deduplication, compression, and converting the data to a data protection form (e.g., a Redundant Array of Independent Disks (RAID) layout). Performing this processing separately at each storage array may be inefficient.

To address these issues, examples described herein may receive a differential multiple write command that specifies to store provided data to a first address range at the first storage array and to a different second address range of a second storage array. In such examples, the first storage array may generate storage-processed data representing the provided data, and replicate, via a replication path between the first and second storage arrays, the storage-processed data from the first storage array to the second storage array with location information specifying that the second storage array is to associate the replicated storage-processed data with the second address range.

In this manner, examples described herein may accomplish writing data to different locations at separate storage arrays in a more efficient manner. For example, in such examples, the data to be written may be converted to the storage-processed form at one of the storage arrays, and then replicated in that format to the other storage arrays in that format, thereby avoiding generating the storage-processed form of the data at each of the storage arrays. In addition, by replicating the storage-processed data among storage arrays using replication path(s), examples described herein may reduce bandwidth usage for the storage protocol paths for both the host and the storage arrays.

Figure 1:
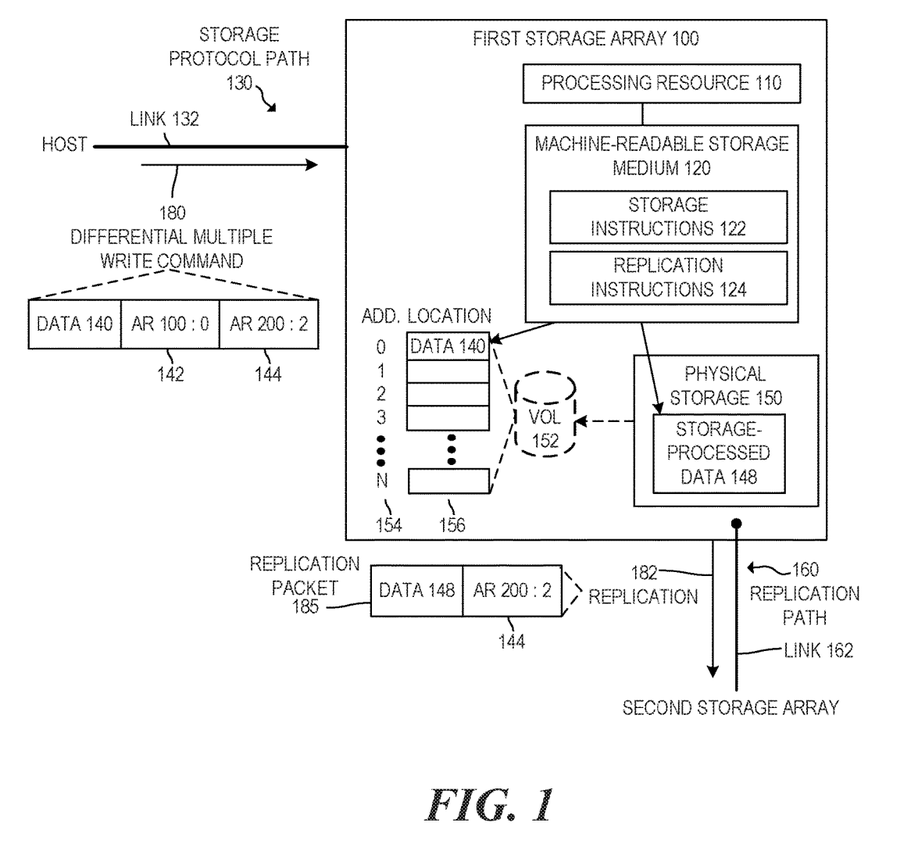
FIG. 1 is a block diagram of an example storage array to replicate storage-processed data based on a differential multiple write command.

Referring now to the drawings, FIG. 1 is a block diagram of an example storage array 100 to replicate storage-processed data 148 based on a differential multiple write command 180. In the example of FIG. 1, storage array 100 (which may be referred to herein as "first" storage array 100) includes at least one processing resource 110 and at least one machine-readable storage medium 120 comprising (e.g., encoded with) at least storage instructions 122 and replication instructions 124 that are executable by the at least one processing resource 110 of storage array 100 to implement functionalities described herein in relation to storage instructions 122 and replication instructions 124, respectively. Storage array 100 may include physical storage 150. In examples described herein, physical storage (such as physical storage 150) may be implemented by one or more physical storage devices, such as, for example, hard disk drives (HDDs), solid state drives (SSDs), or any other suitable type of storage device, or any combination thereof. In examples described herein, functionalities described as being performed by "instructions" may be understood as functionalities that may be performed by those instructions when executed by a processing resource.

In the example of FIG. 1, storage instructions 122 may receive a differential multiple write command 180 via a storage protocol path 130 for storage array 100. Storage protocol path 130 may include any suitable communications link 132 (e.g., wired or wireless, direct or indirect, etc.) between storage array 100 and a host. Differential multiple write command 180 may include provided data 140, which is data to be written to multiple storage arrays and which is provided in command 180. Differential multiple write command 180 may specify to store provided data 140 to a first address range at the first storage array 100 and to a different second address range of a second storage array. In the example of FIG. 1, differential multiple write command 180 includes the provided data 140, location information 142 specifying to store the provided data 140 to a first address range (represented by address "0" in location information 142) at the first storage array 100 (represented by "AR 100" in location information 142), and location information 144 specifying to store the provided data 140 to a different second address range (represented by address "2" in location information 144) of the second storage array (represented by "AR 200" in location information 144).

In examples described herein, an address range may be specified in any suitable manner. For example, the address range may be specified by an address (e.g., a starting address, offset, etc.), a starting address and an offset, a starting address and a length (or size), a starting address and an ending address, or the like. In examples described herein, an address range may be an address range in a logical address space of a virtual storage unit, such as a virtual volume, logical unit number (LUN), namespace, or the like. In some examples, each address range specified in a differential multiple write command may also specify a storage unit (e.g., virtual volume, etc.) for the address range. In such examples, the differential multiple write command may include, for multiple storage arrays, specification of a storage array, a storage unit of that storage array, and an address range of that storage unit at which to store the provided data.

In the example of FIG. 1, first storage array 100 may implement a virtual volume 152 having virtual storage locations 156 specified by addresses 154 in an address space 0-N, which is a representative address space for ease of illustration, as actual addresses or address ranges may be specified or represented differently. First storage array 100 may include physical storage 150, and physical storage locations in physical storage 150 may be allocated to the virtual storage locations 156 of virtual volume 152. The allocated physical storage locations in physical storage 150 may store the actual data that is accessible (e.g., to a host) at virtual storage locations 156 in virtual volume 152.

In the example of FIG. 1, based on (e.g., in response to) receiving differential multiple write command 180, storage instructions 122 may generate storage-processed data 148 representing the provided data 140 in a different form than provided data 140. For example, storage instructions 122 may perform one or more types of storage processing on provided data 140 to generate storage-processed data 148. In examples described herein, storage processing may include performing one or more of deduplication, compression, and data protection processing on provided data to generate storage-processed data that is at least one of compressed, deduplicated, and modified to a data protection form. In examples described herein, a data protection form of data may be a data form, format, layout, distribution, or the like, or a combination thereof, that is to provide enhanced protection against data loss, data corruption, or the like. For example, a data protection format may include any suitable type of Redundant Array of Independent Disks (RAID) layout, erasure code layout, or the like. In such examples, the data protection form may include additional information, such as parity, checksums, or the like, and may be formatted, divided, or the like, for storage across a plurality of different physical storage devices. In such examples, storage instructions 122 may store the storage-processed data 148 in a data protection form across multiple different physical storage devices of physical storage 150, according to any suitable RAID, erasure code, or other like scheme.

In the example of FIG. 1, storage instructions 122 may store the storage-processed data 148 in association with first address range (e.g., "0") at first storage array 100, wherein the first address range is the first address range specified in command 180 (e.g., in location information 142 for the first storage array 100). In examples described herein, to store storage-processed data "in association with" an address range may include storing the storage-processed data (at least in part) in physical storage locations of physical storage that are allocated to the virtual storage location(s) addressed by that address range, such that the provided data represented by the storage-processed data is accessible to a host at that address range.

For example, to store the storage-processed data 148 in association with first address range (e.g., "0") at first storage array 100, storage instructions 122 may store storage-processed data 148 in physical storage locations of physical storage 150 that are allocated to the virtual storage location(s) 156 of first address range (e.g., "0") of virtual volume 152. In such examples, data 140 may be accessible to a host at address range "0" of virtual volume 152 of first storage array 100, while the storage-processed data 148, representing provided data 140, is actually stored in physical storage locations of physical storage 150 allocated to address range "0" of virtual volume 152. In such examples, in response to a host request to read from address range "0"

of virtual volume 152, storage instructions 122 may read the storage-processed data 148 from the physical storage locations of physical storage 150 allocated to address range "0", and reconstruct the provided data 140 from the storage-processed data 148, and return the provided data 140 to the requesting host. In such examples, reconstructing the provided data may include one or more of reconstructing the data from a data protection form, de-compressing the data, or reconstructing the data from a deduplicated form, or a combination thereof.

Although the storage-processed data may be described as being stored in physical storage locations of physical storage that are allocated to virtual storage location(s), in some examples, some of the storage-processed data (e.g., metadata, or other data related to the storage-processed data representation) may be stored elsewhere (e.g., other locations of physical storage or volatile memory), while some or most of the storage-processed data is stored in physical storage locations of physical storage that are allocated to the appropriate virtual storage location(s).

In the example of FIG. 1, based on (e.g., in response to) differential multiple write command 180, replication instructions 124 may replicate 182 storage-processed data 148 from first storage array 100 to the second storage array via a replication path 160 between first storage array 100 and the second storage array. In some examples, replication instructions 124 may replicate 182 storage-processed data 148 with the location information 144 specifying that the second storage array is to associate the replicated storage-processed data 148 with the second address range (i.e., address range "2" in the example of FIG. 1) at the second storage array (i.e., specified by "AR 200"). In such examples, replication instructions 124 replicating 182 storage-processed data 148 to the second storage array may enable the second storage array to store the storage-processed data 148 (representing provided data 140) directly to physical storage of the second storage array, without the second storage array itself performing storage processing to generate storage-processed data 148 from provided data 140. If the first storage array 100 replicated (or otherwise provided) the provided data 140 to the second storage array, then the second storage array may perform storage processing (as described above) on the provided data to generate storage-processed data to store to physical storage. However, in examples as described above, in which replication instructions 124 provide the storage-processed data 148 to the second storage array, processing on the second storage array may be reduced, by avoiding performing the storage processing of the provided data 140 on the second storage array.

In some examples, replication 182, by replication instructions 124, may include using replication-specific communication techniques to perform the replication 182 via replication path 160. In some examples, replication 182, by replication instructions 124, may include providing a replication packet 185 to the second storage array via the replication path 160, wherein the replication packet 185 includes at least storage-processed data 148, and location information 144 specifying to store the provided data 140 to the second address range (e.g., specified by "2") of the second storage array (e.g., specified by "AR 200").

In the example of FIG. 1, the second address range (e.g., "2") specified for the second storage array is different than the first address range (e.g., "0") specified for first storage array 100. In such examples, the first and second address ranges may be non-equivalent address ranges (e.g., specified by different address range numerical or other values) of different storage units (e.g., virtual volumes), as opposed to, for example, the same (or equivalent) address ranges (e.g., specified by the same address range numerical values or other values) of different storage units.

Replication path 160 may include any suitable communications link 162 (e.g., wired or wireless, direct or indirect, etc.) between first storage array 100 and the second storage array. In examples described herein, any replication path is separate from any storage protocol path for a storage array. For example, the communications link(s) of a replication path are physically separate from the communications link(s) of any storage protocol path(s) for storage array(s). In such examples, a replication path is out-of-band with respect to any storage protocol paths(s) for storage array(s). In example of FIG. 1, for example, the replication path 160 is separate from any storage protocol path for either of first storage array 100 and separate from any storage protocol path for the second storage array. For example, communications link 162 of replication path 160 is physically separate from communications link 132 of storage protocol path 130, and is physically separate from the communication link(s) of any other storage protocol paths for first storage array 100 or the second storage array.

In examples described herein, a storage protocol path may be a combination of hardware (e.g., communications interfaces, communication links, etc.) and instructions (e.g., executable by a processing resource) to communicate (e.g., receive, output, etc.) host-level commands (e.g., read, write, etc.) of a storage protocol used by a host in a computing environment. Examples of such storage protocols may include, for example, protocols consistent with Small Computer System Interface (SCSI), Internet Small Computer System Interface (iSCSI), NVMe™ (i.e., NVM Express™, where NVM stands for Non-Volatile Memory), NVMe-oF™ (NVM Express™ over Fabrics), or other protocols used by a host in a computing environment to communicate storage commands, such as read and write commands, to a storage array separate from the host in the computing environment. In such examples, a storage protocol path is used by hosts and storage arrays to communicate (e.g., send and receive) data in a form that is useable by a host application of a host of the computing environment. In some examples, a storage protocol path may be considered to be a host-level read/write path. In some examples, a suitable storage protocol used on a storage protocol path may be a storage protocol that a host may use to communicate storage commands (e.g., read and write commands) to different types of storage devices (e.g., storage devices from different vendors or the like). In such examples, the suitable storage protocols may be storage protocols used across different storage devices of different storage device vendors. In some examples, a storage protocol path may be implemented using any of Ethernet, Fibre Channel, or Serial Attached SCSI (SAS), for example, or any other transport suitable for the storage protocol.

In examples described herein, a replication path may be a combination of hardware (e.g., communications interfaces, communication links, etc.) and instructions (e.g., executable by a processing resource) to communicate (e.g., receive, output, etc.) data between storage arrays of a computing environment using replication-specific communication techniques that are not used or supported by any host of the computing environment. In some examples, a replication path may not use any storage protocol that is used on a storage protocol path of the computing environment, such as SCSI, iSCSI, NVMe™, NVMe-oF™, or the like. In some examples, replication-specific communication techniques utilized on a replication path may be vendor-specific replication communication techniques that may be used exclusively between storage devices (e.g., storage arrays) from the same vendor. In examples described herein, the replication-specific communication techniques used on a replication path may be exclusively used by storage arrays in the computing environment for array-to-array communications to keep data coordinated on the storage arrays, and do utilize host-level read and write commands (e.g., SCSI read and write commands, or the like). In some examples, the replication-specific communication techniques may include data enhancements to improve the efficiency of transport between arrays, such as communicating data between storage arrays in a storage-processed form in which the data is stored on physical storage device(s) on one of the storage arrays. In some examples described herein, a replication path may be physically and logically separate from any path connecting a storage array and a host of a computing environment. In such examples a replication path is not accessible to a host computing device of a computing environment.

In some examples, replication instructions 124 may be part of an implementation of a replication engine of first storage array 100. In examples described herein, a replication engine may be an engine of first storage array 100 that is dedicated to implementing replication processes for the first storage array 100 to other storage array(s). In some examples, a replication engine may be implemented by any combination of hardware and programming, such as processor executable instructions (e.g., including replication instructions 124) stored on at least one non-transitory machine-readable storage medium and the hardware for the engines may include at least one processing resource to execute those instructions. In some examples, functionalities described herein in relation to FIG. 1 may be provided in combination with functionalities described herein in relation to any of FIGS. 2-5.

Figure 2:
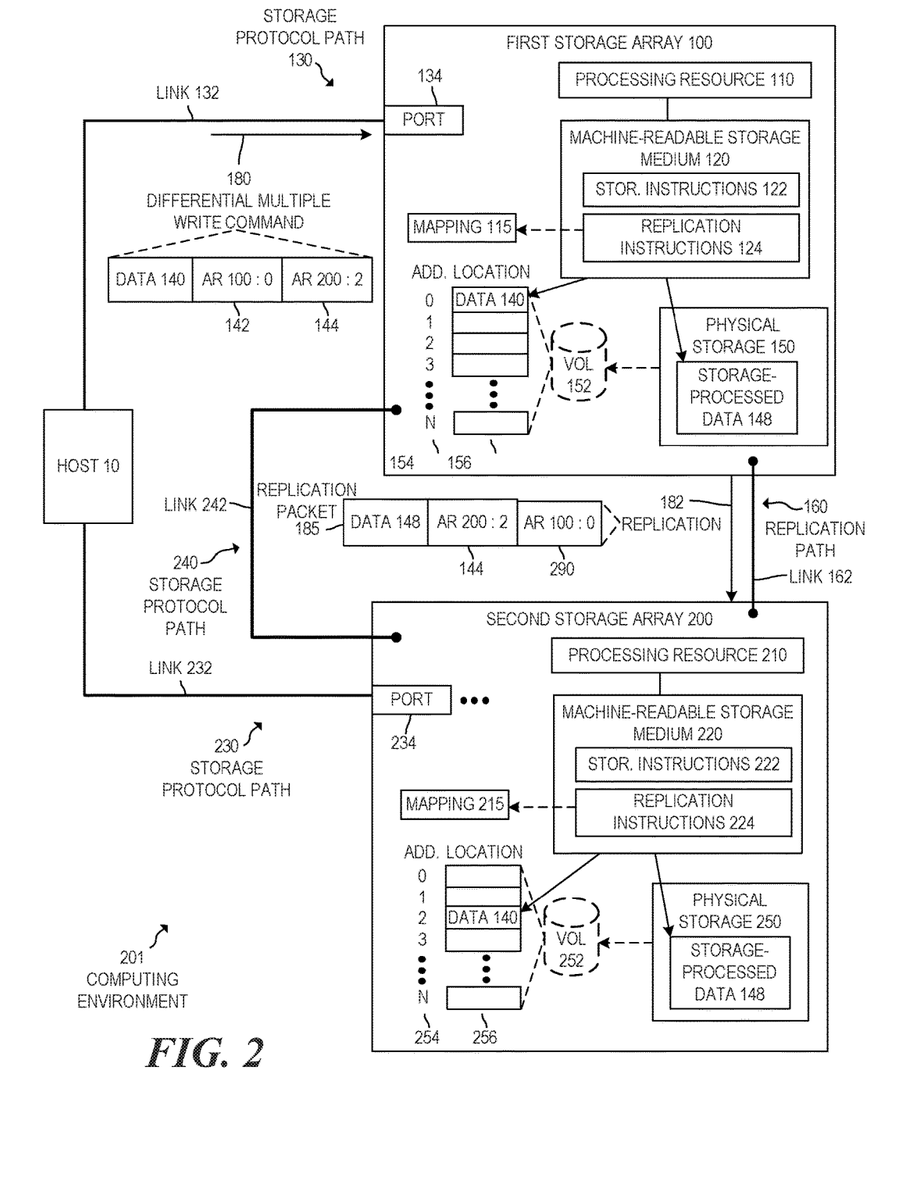
FIG. 2 is a flowchart of an example computing environment including a first storage array to replicate storage-processed data to a second storage array based on a differential multiple write command.

FIG. 2 is a block diagram of an example computing environment 201 including a first storage array 100 to replicate storage-processed data 148 to a second storage array 200 based on a differential multiple write command 180. In the example of FIG. 2, computing environment 201 may include a host computing device 10 to send a differential multiple write command 180. Computing environment 201 may include first storage array 100, as described above in relation to FIG. 1. In the example of FIG. 2, an interface 134 (e.g., a port, a network interface, a fibre channel interface, etc.) of first storage array 100 is illustrated. In some examples, interface 134 and link 132 (as described above) may be part of storage protocol path 130 (as described above) between (i.e., connecting) host 10 and first storage array 100. Computing environment 201 may include a second storage array 200. In the example of FIG. 2, replication path 160, as described above, may be a replication path between first storage array 100 and second storage array 200.

In the example of FIG. 2, storage array 200 includes at least one processing resource 210 and at least one machine-readable storage medium 220 comprising (e.g., encoded with) at least storage instructions 222 and replication instructions 224 that are executable by the at least one processing resource 210 of storage array 200 to implement functionalities described herein in relation to storage instructions 222 and replication instructions 224, respectively. Storage instructions 222 and replication instructions 224 of storage array 200 may be the same as storage instructions 122 and replication instructions 124 of storage array 100, as described above, respectively. Storage array 200 may include physical storage 250.

In the example of FIG. 2, second storage array 200 may implement a virtual volume 252 having virtual storage locations 256 specified by addresses 254 in an address space 0-N (which is a representative address space for ease of illustration, as actual addresses or address ranges may be specified or represented differently). Physical storage locations in physical storage 250 may be allocated to the virtual storage locations 256 of virtual volume 252. The allocated physical storage locations in physical storage 250 may store the actual data that is accessible (e.g., to a host) at virtual storage locations 256 in virtual volume 252. In the example of FIG. 2, a storage protocol path 230 may include any suitable communications link 232 (e.g., wired or wireless, direct or indirect, etc.) between second storage array 200 and host computing device 10. An interface 234 (e.g., a port, a network interface, a fibre channel interface, etc.) of second storage array 200 may also be considered to be part of storage protocol path 230.

In the example of FIG. 2, storage instructions 122 may receive a differential multiple write command 180 via storage protocol path 130, as described above. In the example of FIG. 2, storage instructions 122 of first storage array 100 may receive differential multiple write command 180 from host computing device 10 via storage protocol path 130 between host computing device 10 and first storage array 100.

As described above in relation to FIG. 1, differential multiple write command 180 may include provided data 140, may specify (e.g., via location information 142) to store the provided data 140 to a first address range (e.g., "0") at first storage array 100 (e.g., "AR 100"), and may specify (e.g., via location information 144) to store the provided data 140 to a different second address range (e.g., "2") of second storage array 200 (e.g., via location information 144).

Storage instructions 122 may generate, from provided data 140, storage-processed data 148 representing the provided data 140 in a different form than provided data 140, as described above in relation to FIG. 1, and as further described below. As described above, storage instructions 122 may store the storage-processed data 148 to physical storage 150 (e.g., in physical storage locations of physical storage 150 that are allocated to the first address range (e.g., "0") indicated in command 180), such that the provided data 140 is accessible (e.g., to host 10) at the first address range at first storage array 100. For example, storage instructions 122 may store storage-processed data 148 to first physical storage locations in physical storage 150 of first storage array 100 that are allocated to first address range (e.g., the virtual storage location 156 addressed at least in part by "0") of virtual volume 152 of first storage array 100, such that provided data 140 is accessible to a host at first address range (e.g., "0") of virtual volume 152 of first storage array 100, as described above in relation to FIG. 1.

In the example of FIG. 2, based on (e.g., in response to) differential multiple write command 180, replication instructions 124 may replicate storage-processed data 148 from physical storage 150 of first storage array 100 to second storage array 200 via replication path 160 between first storage array 100 and second storage array 200. In such examples, replication instructions 124 may replicate storage-processed data 148 to second storage array 200 with location information 144 specifying that second storage array 200 (e.g., "AR 200") is to associate the replicated storage-processed data 148 (e.g., of replication packet 185) with the second address range (e.g., "2"), such that provided data 140 is accessible (e.g., by a host) at the second address range (e.g., the virtual storage location 256 addressed at least in part by "2") at second storage array 200. In such examples, replicating 182 storage-processed data 148 to the second storage array 200 may reduce processing on the second storage array 200, as second storage array 200 may store the storage-processed data 148 (representing provided data 140) directly to physical storage 250 of second storage array 200, without second storage array 200 itself (e.g., storage instructions 222) performing storage processing to generate storage-processed data 148 from provided data 140, as described above.

In some examples, the location information 144 of the replication packet 185 may specify to second storage array 200 to store the replicated storage-processed data 148 in association with the second address range (e.g., "2") of a virtual volume 252 of second storage array 200, such that provided data 140 is accessible to the host 10 at the second address range (e.g., "2") of virtual volume 252 of second storage array 200. In such examples, as described above, the address range information may include specification of a virtual volume, for example.

In the example of FIG. 2, location information 144 of replication packet 185 may indicate that for the second storage array 200 (e.g., "AR 200") the storage-processed data 148 is to be stored in association with a second address range (e.g., "2") of second storage array 200, which may indicate, for example, a virtual storage location 256 associated with address "2" in virtual storage volume 252. In such examples, based on (e.g., in response to) receiving replication packet 185 of replication 182, via replication path 160, replication instructions 224 of storage array 200 may, based on the location information 144 of replication packet 185, store the replicated storage-processed data 148 included in replication packet 185 to physical storage 250 (e.g., to physical storage locations of physical storage 250 that are allocated to the virtual storage location(s) 256 of the second address range (e.g., "2") of virtual volume 252). In such examples, data 140 may be accessible to a host computing device 10 at address range "2" of virtual volume 252 of second storage array 200, while the replicated storage-processed data 148, representing provided data 140, is actually stored in physical storage location(s) 256 of physical storage 250 allocated to address range "2" of virtual volume 252. In such examples, in response to a host request to read from address range "2" of virtual volume 252, storage instructions 222 may read the storage-processed data 148 from the physical storage location(s) 256 of physical storage 250 allocated to address range "2", and reconstruct the provided data 140 from the storage-processed data 148 (as described above), and return the provided data 140 to the requesting host. In such examples, replicating 182 storage-processed data 148 to second storage array 200 may reduce processing on the second storage array 200, as second storage array 200 may store the storage-processed data 148 directly to physical storage 250 of second storage array 200, without second storage array 200 itself (e.g., storage instructions 222) performing storage processing to generate storage-processed data 148 from provided data 140, as described above.

In the example of FIG. 2, replication path 160 is separate from any storage protocol path. For example, replication path 160 is separate from any storage protocol path between host 10 and first storage array 100 (e.g., storage protocol path 130, or the like), and separate from any storage protocol path between host 10 and second storage array 200 (e.g., storage protocol path 230, or the like). In some examples, there may also be at least one storage protocol path 240 (e.g., including a communications link 242) between first and second storage arrays 100 and 200, which may be used for some communications between the first and second storage arrays 100 and 200. In such examples, replication path 160 is separate from any such storage protocol path 130, 230, 240, etc., and the replication 182 described herein is performed separate from (e.g., without any use of) any such storage protocol path 130, 230, 240, etc.

In some examples, replication instructions 124 may maintain, at first storage array 100, an address mapping 115 that associates respective address ranges of the first storage array 100 and respective address ranges of the second storage array 200 where equivalent data is stored. Instructions 124 may generate this mapping 115 based on a plurality of differential multiple write commands (like command 180) received at the first storage array 100. In the example of FIG. 2, for example, based on (e.g., in response to) command 180, replication instructions 124 may, in mapping 115, associate first address range "0" of first storage array 100 with second address range "2" of second storage array 200, as storing equivalent data, since command 180 specifies that provided data 140 is to be stored in association with the first address range "0" of first storage array 100, and in association with the second address range "2" of second storage array 200. Similar associations may be stored in mapping 115 at first storage array 100 in response to other differential multiple write commands received at first storage array 100, as described above. In such examples, the mapping 115 may be used (e.g., by replication instructions 124) to determine where particular data stored on storage array 100 is stored at other array(s) in the computing environment 201.

In some examples, an address mapping may be stored at each storage array in the computing environment 201. In such examples, each replication may include mapping information to inform a replication destination storage array of where the replication source storage array stores the provided data. For example, in such an example, based on (e.g., in response to) the differential multiple write command 180, replication instructions 124 may provide, via replication path 160 (e.g., as part of replication packet 185 of replication 182), mapping information 290 specifying that the provided data 140 is stored in association with the first address range (e.g., "0") at first storage array 100. In response to the mapping information 390, replication instructions 224 of second storage array 200 may, in mapping 215, associate first address range "0" of first storage array 100 with second address range "2" of second storage array 200, as storing equivalent data, since packet 185 specifies that provided data 140 is to be stored in association with the second address range "2" of first storage array 200 (e.g., in information 144), and in association with the first address range "0" of first storage array 100 (e.g., in mapping information 390).

As described above, in examples described herein, storage-processed data may be a representation of the provided data that is at least one of deduplicated, compressed, and modified to a data protection form. In some examples, storage instructions 122 may perform any of deduplication, compression, or data protection modification on the provided data 140, or any combination of one or more of them in any suitable order. For example, storage instructions 122 may perform at least deduplication on a representation of provided data 140 (e.g., provided data 140 or a modified representation of it), such that storage-processed data 148 includes a deduplicated form of provided data 140. For example, storage instructions 122 may perform any suitable type of deduplication, which storage instructions 122 may attempt before attempting either compression (if attempted) or performing data protection modification (if performed), in some examples.

Storage instructions 122 may perform at least compression on a representation of the provided data (e.g., provided data 140 or a modified representation of it), such that the storage-processed data includes a compressed form of the provided data 140. For example, storage instructions 122 may attempt any suitable type of compression, which storage instructions 122 may attempt after attempting deduplication (if attempted) and before performing data protection modification (if performed), in some examples.

Storage instructions 122 may perform at least data protection modification on a representation of the provided data (e.g., provided data 140 or a modified representation of it), such that the storage-processed data includes a data protected form of the provided data 140. For example, storage instructions 122 may attempt any suitable type of compression, which storage instructions 122 may attempt after attempting deduplication (if attempted) and before performing data protection modification (if performed), in some examples. For example, storage instructions 122 may modify the representation of provided data 140 to a suitable RAID layout. In such examples, the data protection form may comprise the RAID layout. In other examples, storage instructions 122 may modify the representation of provided data 140 to a suitable erasure code layout. In such examples, the data protection form may comprise the erasure code layout.

As noted above, in examples described herein, the storage processing of storage instructions 122 may include any suitable type of deduplication. For example, storage instructions 122 may perform at least deduplication on a representation of provided data 140, such that storage-processed data 148 includes a deduplicated form of provided data 140. As an example, storage instructions 122 may maintain a record of data already stored at first storage array 100, and a record of which of that data is known to be stored at another storage array of the computing environment 201 (e.g., using mapping 115, for example). In such examples, storage instructions 122 may determine whether a particular set of provided data 140 can be deduplicated against (e.g., is duplicative of) data already stored at storage array 100, and if so, may store a pointer to the prior copy of the data (rather than again storing the full provided data 140). In such examples, the storage-processed data 148 stored at first storage array 100 may include a pointer to a previously stored copy of provided data 140. In such examples, storage instructions 122 may determine whether the second storage array 200 also has already stored data that is equivalent to the provided data 140 (e.g., based on the actual data that the pointer of the storage processed data 148 points to). In such examples, storage instructions 122 may provide a replication data descriptor in the replication packet 185 to second storage array 200 to instruct replication instructions 224 to store a pointer to the equivalent data already stored on the second storage array 200 in association with the second address range (e.g., "2"). In such examples, the storage-processed data 148 may include deduplication information (e.g., pointers, deduplication tables or portions thereof, or the like), which may be stored in physical storage 150. In such examples, the storage-processed data 148 stored at the second storage array 200 may differ from the storage-processed data 148 stored at the first storage array 100 (e.g., due to pointers pointing to different locations).

In such examples, if storage instructions 122 determine that there is no equivalent data stored at the storage array 100, then storage instructions 122 may not deduplicate the data. If storage instructions 122 determine that equivalent data is stored at storage array 100, but not at second storage array 200, then replication packet 185 may include a representation of the provided data 140 for the second storage array 200. Although one possible deduplication technique is described above for illustrative purposes, any suitable deduplication technique may be used in examples described herein. For example, storage instructions 122 may perform deduplication in such a way that portion(s) of provided data 140 may be deduplicated, while other portion(s) are not. In some examples, storage instructions 122 may perform compression on the output of the deduplication, and may perform data protection modification on the output of the compression. In some examples, functionalities described herein in relation to FIG. 2 may be provided in combination with functionalities described herein in relation to any of FIGS. 1 and 3-5.

Figure 3:
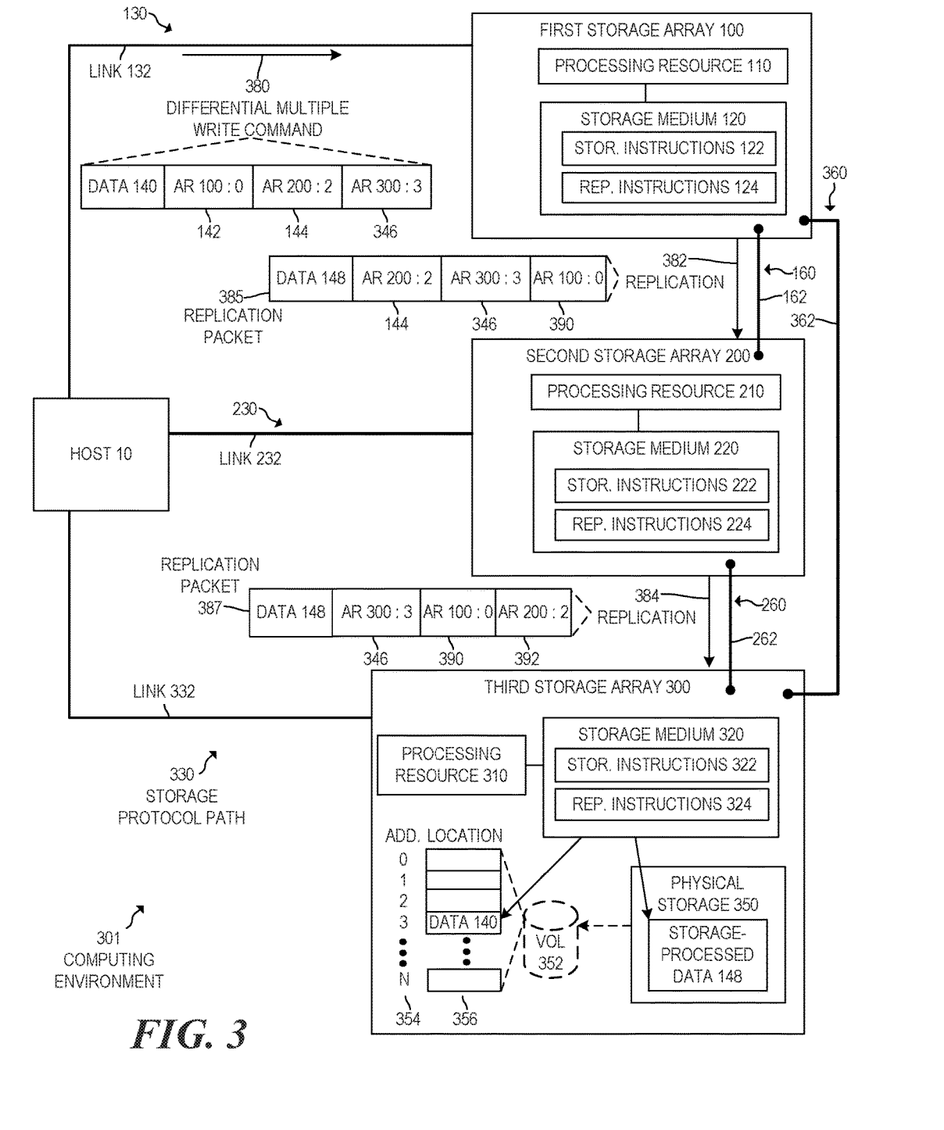
FIG. 3 is a block diagram of an example computing environment including replication among three storage arrays based on a differential multiple write command.

FIG. 3 is a block diagram of an example computing environment 301 including replication among three storage arrays based on (e.g., in response to) a differential multiple write command 380. In the example of FIG. 3, computing environment 301 may include a host computing device 10, as described above, to send a differential multiple write command 380. Computing environment 301 may include first storage array 100 with a storage protocol path 130 between the first storage array 100 and host 10, as described above. Computing environment 301 may include second storage array 200 with a storage protocol path 230 between second storage array 200 and host 10, as described above. Computing environment 301 may include a replication path 160 between first and second storage arrays 100 and 200, as described above.

In the example of FIG. 3, computing environment 301 may include a third storage array 300 that includes at least one processing resource 310 and at least one machine-readable storage medium 320 comprising (e.g., encoded with) at least storage instructions 322 and replication instructions 324 that are executable by the at least one processing resource 310 of storage array 300 to implement functionalities described herein in relation to storage instructions 322 and replication instructions 324. Storage instructions 322 and replication instructions 324 of storage array 200 may be the same as storage instructions 122 and replication instructions 124 of storage array 100, as described above, respectively. Storage array 300 may include physical storage 350. Computing environment 301 may include a storage protocol path 330 between host 10 and third storage array 300, the storage protocol path 330 including a link 332.

In the example of FIG. 3, third storage array 300 may implement a virtual volume 352 having virtual storage locations 356 specified by addresses 354 in an address space 0-N (which is a representative address space for ease of illustration, as actual addresses or address ranges may be specified or represented differently). Physical storage locations in physical storage 350 may be allocated to the virtual storage locations 356 of virtual volume 352. The allocated physical storage locations in physical storage 350 may store the actual data that is accessible (e.g., to a host) at virtual storage locations 356 in virtual volume 352.

In the example of FIG. 3, storage instructions 122 may receive a differential multiple write command 380 via storage protocol path 130. In the example of FIG. 3, the differential multiple write command 380 may include provided data 140, location information 142 to specify to store provided data 140 to a first address range (e.g., "0") at first storage array 100 (e.g., "AR 100"), location information 144 to specify to store provided data 140 to the second address range (e.g., "2") of the second storage array 200 (e.g., "AR 200"), and location information 346 to specify to store provided data 140 to a third address range (e.g., "3") of a third storage array 300 (e.g., "AR 300"). In the example of FIG. 3, the first, second, and third address ranges are different from one another.

In such examples, the provided data 140 is to be stored on three storage arrays (though in other examples, a differential multiple write command may specify that data is to be stored at any number of storage arrays). In some examples, the data may be replicated serially among the arrays, such as, for example, from the first storage array 100 to the second storage array 200, and then replicated from the second storage array 200 to the third storage array 300, as described below.

In such examples, storage instructions 122 may generate, from provided data 140, storage-processed data 148 representing the provided data 140 in a different form than provided data 140, as described above in relation to FIG. 1, and may store the storage-processed data 148 in physical storage 150. For example, storage instructions 122 may store the storage-processed data 148 in physical storage 150 (e.g., in physical storage locations of physical storage 150 that are allocated to the first address range (e.g., "0" of virtual volume 152) indicated in command 380, such that the provided data 140 is accessible (e.g., to host 10) at the first address range at first storage array 100).

In the example of FIG. 3, based on (e.g., in response to) differential multiple write command 380, replication instructions 124 may replicate 382 storage-processed data 148 from physical storage 150 of first storage array 100 to second storage array 200 via replication path 160 between first storage array 100 and second storage array 200. In such examples, replication instructions 124 may replicate storage-processed data 148 to second storage array 200 with location information 144 specifying that second storage array 200 (e.g., "AR 200") is to associate the replicated storage-processed data 148 (e.g., of replication packet 185) with the second address range (e.g., "2"), such that provided data 140 is accessible (e.g., by a host) at the second address range (e.g., the virtual storage location 256 addressed at least in part by "2") at second storage array 200.

In some examples, based on (e.g., in response to) differential multiple write command 380, replication instructions 124 may provide, via replication path 160, location information 346 specifying to store the replicated storage-processed data 148 in association with the third address range (e.g., "3") at the third storage array 300 (e.g., "AR 300"). In such examples, a replication packet 385 provided by replication 382 may include storage-processed data 148, location information 144, and location information 346. In some examples, replication packet 385 may also include the mapping information 390 described above in relation to FIG. 2.

In such examples, storage instructions 222 of second storage array 200 may store the replicated storage-processed data 148 to physical storage 250 and in association with the second address range (e.g., "2" of a virtual volume 252) at second storage array 200, such that provided data 140 is accessible to the host 10 at the second address range (e.g., "2" of virtual volume 252) at second storage array 200. In such examples, second storage array 200 may store the storage-processed data 148 directly to physical storage (e.g., 250) of second storage array 200, without second storage array 200 itself (e.g., storage instructions 222) performing storage processing to generate storage-processed data 148 from provided data 140, as described above. In some examples, replication instructions 224 of second storage array 200 may replicate 384 the storage-processed data 148 from second storage array 200 to third storage array 300 via a replication path 260 (including communications link 262, for example) between the second storage array 200 and the third storage array 300. In such examples, replication instructions 224 may replicate the storage-processed data 148 to third storage array 300 with location information 346 specifying that third storage array 300 is to associate the replicated storage-processed data 148 with the third address range (e.g., "3" of virtual volume 352) of third storage array 300. In some examples, a replication packet 387, provided by replication 384, may include storage-processed data 148, location information 346, mapping information 390, and mapping information 392 indicating which address range the second storage array 200 stored the data 148 in association with. Although examples described herein show replication packets including information based on a single differential write command, in some examples replication packets may include information based on multiple differential write commands, such as different sets of storage-processed data (representing provided data from different differential write command) and location information for each set of storage-processed data.

In such examples, storage instructions 322 of third storage array 300 may store the replicated storage-processed data 148 to physical storage 350 and in association with the third address range (e.g., "3" of a virtual volume 352) at third storage array 300, such that provided data 140 is accessible to the host 10 at the third address range (e.g., "3" of virtual volume 352) at third storage array 300. In such examples, replicating 384 storage-processed data 148 to third storage array 300 may reduce processing on the third storage array 300, as third storage array 300 may store the storage-processed data 148 directly to physical storage 350 of third storage array 300, without third storage array 300 itself (e.g., storage instructions 322) performing storage processing to generate storage-processed data 148 from provided data 140, as described above. In some examples, replication instructions 324 may use mapping information 390 and 392 to update its mapping information, as described above in relation to FIG. 2.

In other examples, based on (e.g., in response to) differential multiple write command 380, first storage array 100 may replicate the data to each other storage array specified in the command 380. In such examples, replication instructions 124 may replicate storage-processed data 148 to the second storage array 200 via replication path 160, as described above. In addition, in such examples, based on (e.g., in response to) differential multiple write command 380, replication instructions 124 may replicate the storage-processed data 148 from the first storage array 100 to the third storage array 300 via a replication path 360 (e.g., including a communications link 362) between the first and third storage arrays 100 and 300. In such examples, the storage-processed data 148 may be replicated to the third storage array 300 with location information 346 specifying to the third storage array 300 to store the replicated storage-processed data 148 in association with the third address range (e.g., "3") at the third storage array 300. In such examples, replication path 360 is separate from any storage protocol path for the first, second, or third storage arrays (e.g., storage protocol paths 130, 230, and 330, for example).

In examples described herein, any functionalities described in relation to any of storage instructions 122, 222, or 322 may be performed by any other of storage instructions 122, 222, and 322, and any functionalities described in relation to any of replication instructions 124, 224, or 324 may be performed by any other of replication instructions 124, 224, and 324. Although examples are described herein in relation to replication between two or three storage arrays, examples described herein may similarly be provided among larger groups of storage arrays. Some such examples may perform more than one or two replications of storage-processed data, such as when differential multiple write commands indicate to store the provided data in more than three storage arrays. In such examples, replication of storage-processed data, as described above, may be performed by other and/or additional storage arrays (e.g., from the third storage array to a fourth storage array, etc., and the like). In some examples, functionalities described herein in relation to FIG. 3 may be provided in combination with functionalities described herein in relation to any of FIGS. 1-2 and 4-5.

Figure 4:
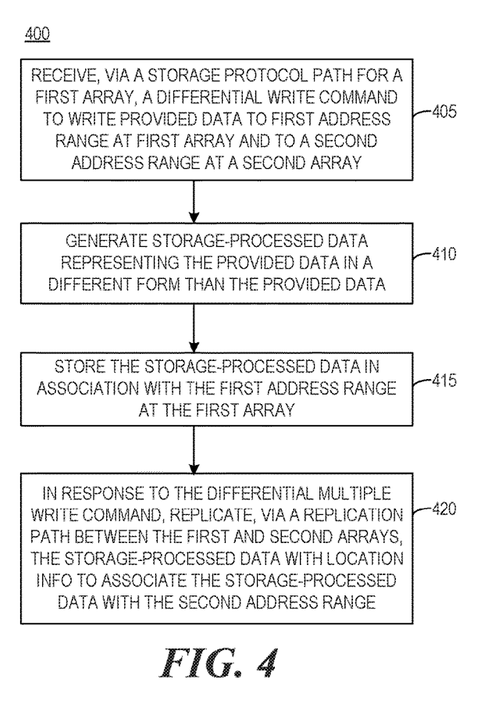
FIG. 4 is a flowchart of an example method including replication of storage-processed data based on a differential multiple write command.

FIG. 4 is a flowchart of an example method 400 including replication of storage-processed data based on a differential multiple write command. Although execution of method 400 is described below with reference to first storage array 100, other storage arrays suitable for the execution of method 400 may be utilized (e.g., storage arrays 200 or 300 of FIGS. 2 and 3). Additionally, implementation of method 400 is not limited to such examples.

Referring to FIG. 4, at 405 of method 400, storage instructions 122, when executed, may receive, via a storage protocol path 130 for a first storage array 100, a differential multiple write command 180 that specifies to store provided data 140 to a first address range (e.g., "0") at the first storage array 100 and to a different second address range (e.g., "2") of a second storage array 200. At 410, storage instructions 122, when executed, may generate, with at least one processing resource 110 of first storage array 100, storage-processed data 148 representing the provided data 140 in a different form than the provided data 140, as described above. At 415, storage instructions 122, when executed, may store the storage-processed data 148 in association with the first address range (e.g., "0") at the first storage array 100.

At 420, based on (e.g., in response to) the differential multiple write command 180, replication instructions 124, when executed, may replicate 182, via a replication path 160 between the first and second storage arrays 100 and 200, the storage-processed data 148 from the first storage array 100 to the second storage array 200 with location information 144 specifying that the second storage array 200 is to associate the replicated storage-processed data 148 with the second address range (e.g., "2"), wherein the replication path 160 is separate from any storage protocol path (e.g., storage protocol paths 130, 230, and 240, for example) for the first or second storage arrays 100 or 200. In some examples, functionalities described herein in relation to FIG. 4 may be provided in combination with functionalities described herein in relation to any of FIGS. 1-3 and 5.

Figure 5:
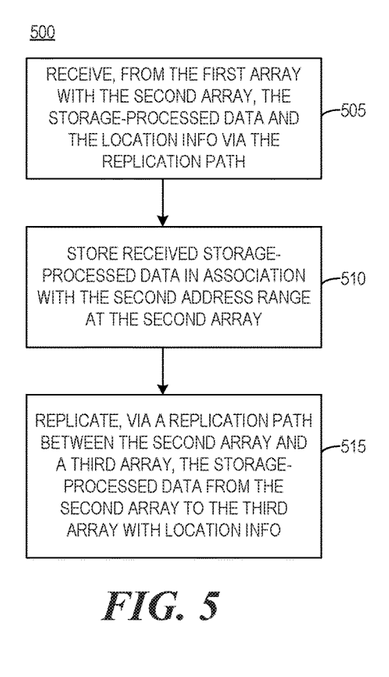
FIG. 5 is a flowchart of an example method including replication of received storage-processed data.

FIG. 5 is a flowchart of an example method 500 including replication of received storage-processed data. Although execution of method 500 is described below with reference to second storage array 200, other storage arrays suitable for the execution of method 400 may be utilized (e.g., storage arrays 100 or 300 of FIGS. 2 and 3). Additionally, implementation of method 500 is not limited to such examples. In some examples, method 500 may be executed by a second storage array 200 after method 400 is executed by a first storage array 100.

At 505 of method 500, storage instructions 222 of storage array 200, when executed, may receive, from the first storage array 100, the storage-processed data 148 from the first storage array 100 and the location information 144, via the replication path 160 between the first and second storage arrays 100 and 200. At 510, storage instructions 222, when executed, may store the received storage-processed data 148 in association with the second address range (e.g., "2") at the second storage array 200, as described above. In such examples, storage instructions 222 of second storage array 200 may store the storage-processed data 148 directly to physical storage 250 of second storage array 200, without second storage array 200 itself (e.g., storage instructions 222) performing storage processing to generate storage-processed data 148 from provided data 140, as described above.

In some examples, further location information 346 may be provided with the storage-processed data 148 and location information 144 (e.g., as part of a replication packet). In some examples, the further location information 346 may specify that a third storage array 300 is to associate the replicated storage-processed data 148 with a third address range (e.g., "3") different than the first and second address ranges (e.g., "0" and "2"). In such examples, at 515, replication instructions 224, when executed may replicate, via a replication path 384 between the second storage array 200 and the third storage array 300, the storage-processed data 148 from the second storage array 200 to the third storage array 300 with location information 346 specifying that the third storage array 300 is to associate the replicated storage-processed data 148 with the third address range (e.g., "3"), as described above.

Although the flowchart of FIG. 5 shows a specific order of performance of certain functionalities, method 500 is not limited to that order. For example, the functionalities shown in succession in the flowchart may be performed in a different order, may be executed concurrently or with partial concurrence, or a combination thereof. In some examples, functionalities described herein in relation to FIG. 6 may be provided in combination with functionalities described herein in relation to any of FIGS. 1-5.

In examples described herein, a storage array may be a computing device comprising a plurality of storage devices and one or more controllers to interact with host devices and control access to the storage devices. In some examples, the storage devices may include hard disk drives (HDDs), solid state drives (SSDs), or any other suitable type of storage device, or any combination thereof. In some examples, the controller(s) may virtualize the storage capacity provided by the storage devices to enable a host to access a virtual object (e.g., a volume) made up of storage space from multiple different storage devices.

As used herein, a "computing device" may be a server, storage device, storage array, desktop or laptop computer, switch, router, or any other processing device or equipment including a processing resource. In examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. In examples described herein, a processing resource may fetch, decode, and execute instructions stored on a storage medium to perform the functionalities described in relation to the instructions stored on the storage medium. In other examples, the functionalities described in relation to any instructions described herein may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution. In the example of FIG. 1, storage medium 120 may be implemented by one machine-readable storage medium, or multiple machine-readable storage media.

In other examples, the functionalities described above in relation to instructions described herein may be implemented by one or more engines which may be any combination of hardware and programming to implement the functionalities of the engine(s). In examples described herein, such combinations of hardware and programming may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one of the engine(s). In some examples, the at least one machine-readable storage medium may store instructions that, when executed by the at least one processing resource, at least partially implement some or all of the engine(s). In such examples, a computing device may include the at least one machine-readable storage medium storing the instructions and the at least one processing resource to execute the instructions. In other examples, the engine may be implemented by electronic circuitry.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard disk drive (HDD)), a solid state drive, any type of storage disc (e.g., a compact disc, a DVD, etc.), or the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components. In some examples, instructions may be part of an installation package that, when installed, may be executed by a processing resource to implement functionalities described herein.

All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. An article comprising at least one non-transitory machine-readable storage medium comprising instructions executable by at least one processing resource of a first storage array to:
receive, via a storage protocol path for the first storage array, a differential multiple write command that specifies to store provided data to a first address range at the first storage array and to a different second address range of a second storage array;
generate storage-processed data representing the provided data in a different form than the provided data;
store the storage-processed data in association with the first address range at the first storage array; and
based on the differential multiple write command, replicate, via a replication path between the first and second storage arrays, the storage-processed data from the first storage array to the second storage array with location information specifying that the second storage array is to associate the replicated storage-processed data with the second address range, wherein the replication path is separate from any storage protocol path for the first or second storage arrays.

2. The article of claim 1, wherein the instructions to store the storage-processed data comprise instructions executable by the at least one processing resource to:
store the storage-processed data to first physical storage locations of the first storage array that are allocated to the first address range of a virtual volume of the first storage array, such that the provided data is accessible to a host at the first address range of the virtual volume of the first storage array.

3. The article of claim 2, wherein the location information specifies to the second storage array to store the replicated storage-processed data in association with the second address range of a virtual volume of the second storage array, such that the provided data is accessible to the host at the second address range of the virtual volume of the second storage array.

4. The article of claim 1, wherein:
the differential multiple write command specifies to store the provided data to the first address range at the first storage array, to the second address range of the second storage array, and to a third address range of a third storage array; and
the first, second, and third address ranges are different from one another.

5. The article of claim 4, wherein the instructions to replicate comprise instructions executable by the at least one processing resource to:
based on the differential multiple write command, replicate, via another replication path between the first and third storage arrays, the storage-processed data from the first storage array to the third storage array with other location information specifying to the third storage array to store the replicated storage-processed data in association with the third address range at the third storage array, wherein the another replication path is separate from any storage protocol path for the first, second, or third storage arrays.

6. The article of claim 4, wherein the instructions to replicate comprise instructions executable by the at least one processing resource to:
based on the differential multiple write command, provide, via the replication path between the first and second storage arrays, other location information specifying to store the replicated storage-processed data in association with the third address range at the third storage array.

7. The article of claim 1, wherein the instructions comprise instructions executable by the at least one processing resource to:
maintain, at the first storage array, an address mapping that associates respective address ranges of the first storage array and respective address ranges of the second storage array where equivalent data is stored, based on a plurality of differential multiple write commands received at the first storage array.

8. The article of claim 7, wherein the instructions to replicate comprise instructions executable by the at least one processing resource to:
based on the differential multiple write command, provide, via the replication path between the first and second storage arrays, mapping information specifying that the provided data is stored in association with the first address range at the first storage array.

9. The article of claim 1, wherein the storage-processed data is a representation of the provided data that is at least one of deduplicated, compressed, or modified to a data protection form.

10. The article of claim 9, wherein the data protection form comprises a Redundant Array of Independent Disks (RAID) layout.

11. The article of claim 1, wherein the instructions to store comprise instructions executable by the at least one processing resource to:
perform at least deduplication on a representation of the provided data, such that the storage-processed data includes a deduplicated form of the provided data.

12. A first storage array comprising:
at least one processing resource; and
at least one non-transitory machine-readable storage medium comprising instructions executable by at least one processing resource to:
receive, via a storage protocol path, a differential multiple write command that specifies to store provided data to a first address range of a virtual volume at the first storage array and to a different second address range of a virtual volume of the second storage array;
generate storage-processed data representing the provided data in a different form than the provided data;
store the storage-processed data in physical storage allocated to the first address range, such that the provided data is accessible at the first address range at the first storage array; and
based on the differential multiple write command, replicate, via a replication path between the first and second storage arrays, the storage-processed data from the physical storage to the second storage array with location information specifying that the second storage array is to associate the replicated storage-processed data with the second address range, such that the provided data is accessible at the second address range at the second storage array, wherein the replication path is separate from any storage protocol path.

13. The first storage array of claim 12, the instructions to generate comprising instructions executable by at least one processing resource to:
perform at least compression on a representation of the provided data, such that the storage-processed data includes a compressed form of the provided data.

14. The first storage array of claim 12, the instructions to generate comprising instructions executable by at least one processing resource to:
perform at least data protection modification on a representation of the provided data, such that the storage-processed data includes a data protected form of the provided data.

15. The first storage array of claim 14, the instructions to perform at least the data protection modification comprising instructions executable by at least one processing resource to:
modify a representation of the provided data to a Redundant Array of Independent Disks (RAID) layout.

16. The first storage array of claim 14, the instructions to perform at least the data protection modification comprising instructions executable by at least one processing resource to:
modify a representation of the provided data to an erasure code layout.

17. The first storage array of claim 12, wherein the storage-processed data is a representation of the provided data that is at least one of deduplicated, compressed, or modified to a data protection form.

18. A method comprising:
receiving, via a storage protocol path for a first storage array, a differential multiple write command that specifies to store provided data to a first address range at the first storage array and to a different second address range of a second storage array;
generating, with at least one processing resource of the first storage array, storage-processed data representing the provided data in a different form than the provided data;
storing the storage-processed data in association with the first address range at the first storage array; and
based on the differential multiple write command, replicating, via a replication path between the first and second storage arrays, the storage-processed data from the first storage array to the second storage array with location information specifying that the second storage array is to associate the replicated storage-processed data with the second address range, wherein the replication path is separate from any storage protocol path for the first or second storage arrays.

19. The method of claim 18, further comprising:
receiving, from the first storage array with the second storage array, the storage-processed data from the first storage array and the location information, via the replication path between the first and second storage arrays; and
storing the received storage-processed data in association with the second address range at the second storage array.

20. The method of claim 19, wherein further location information specifies that the third storage array is to associate the replicated storage-processed data with a third address range different than the first and second address ranges, the method further comprising:
with the second storage array, replicating, via a replication path between the second storage array and a third storage array, the storage-processed data from the second storage array to the third storage array with other location information specifying that the third storage array is to associate the replicated storage-processed data with the third address range.

* * * * *